United States Patent [19]

Tolley

[11] Patent Number: 4,771,569
[45] Date of Patent: Sep. 20, 1988

[54] POTTING MACHINE

[75] Inventor: Ian S. Tolley, Renmark, Australia

[73] Assignee: Tolley's Nurseries Pty. Limited, Australia

[21] Appl. No.: 678,553

[22] PCT Filed: Mar. 14, 1984

[86] PCT No.: PCT/AU84/00033
§ 371 Date: Nov. 14, 1984
§ 102(e) Date: Nov. 14, 1984

[87] PCT Pub. No.: WO84/03605
PCT Pub. Date: Sep. 27, 1984

[30] Foreign Application Priority Data

Mar. 16, 1983 [NZ] New Zealand .......................... 203588

[51] Int. Cl.⁴ .............................................. A01G 9/08
[52] U.S. Cl. ...................................... 47/1 A; 141/103
[58] Field of Search .................. 47/1 A; 141/125, 103

[56] References Cited

U.S. PATENT DOCUMENTS

| 1,477,485 | 12/1923 | Haskell | 141/103 |
| 2,869,283 | 1/1959 | Krause | 47/1 A |
| 3,587,675 | 6/1971 | DiTucci | 47/1 A |
| 3,657,839 | 4/1972 | Krause | 47/1 A |
| 3,782,033 | 1/1974 | Hickerson | 47/1 A |
| 4,020,881 | 5/1977 | Nothen | 47/1 A |

Primary Examiner—Richard J. Johnson
Attorney, Agent, or Firm—Cushman, Darby & Cushman

[57] ABSTRACT

A method of potting plants and a plant potting machine (1) for placing potting mix and a plant in a potting container in which the machine includes means to support in rotable manner a bracket (7) to hold a container through a series of stations with means to both deliver and vibrate the container incorporated with the machine, the method of including the step of locating the plant with its roots in the container prior to or during the filling of the container with potting mix and vibrating the container during the filling process.

6 Claims, 5 Drawing Sheets

Fig 3

POTTING MACHINE

This invention relates to potting machines, more particularly a machine to pot plants into any one of a variety of containers or bags.

The machine is designed for reducing the cost and improving the efficiency of the potting of plants by delivering the proper amount of potting mix into the container, compacting the mix after placement of the plant and placing the finished product for easy removal from the machine; in the case of plastic bags, hard pots and other similar containers automatic removal to a suitable mechanised conveyor.

The invention comprises the steps of a method of placing potting mix and a plant in a potting container wherein said machine comprises a plurality of holders to receive a container for the plant mounted on a rotatable bracket, means for rotating said bracket in stepwise fashion so that each holder passes through a series of stations, means to deliver potting mix to the holder at a filling station, and means to vibrate said container to compact said mixture.

According to a further form of this invention this includes the method of planting a plant within a container the method being characterised in that there is included the steps of locating the roots of a plant within the container either before or during the filling of the container with potting mix, and vibrating the container to consolidate the potting mix around the roots of the plant during the filling step.

Hitherto, the method of planting a plant within a container has comprised the steps of inserting potting mix into the container, gouging or impressing a hole into the mix, inserting a plant and especially the roots of the plant within the hole and then topping the hole up with further potting mix and consolidating by packing the soil around the plant.

After substantial investigation, it has been found that such a process requires significant equipment to effect the necessary steps, has an unfortunate characteristic of effecting in some instances unwanted packing of the soil and a tendency from the action to damage hair roots and the root structure of the plant.

The concept therefore of allowing the potting mix to fill around the roots while this is positioned in the appropriate location on a container minimises such damage to hair roots and consolidation to the extent necessary to reasonably hold the plant is achieved by external vibration which allows minimal damage therefore to the hair roots.

In order to illustrate the invention reference will now be made to the accompanying drawings in which.

The machine 1 consists of a rotating horizontal circular table 2 to which are attached four pivoted brackets 3 which have both a horizontal 4 and vertical member 5 preferably made of square steel bar. The horizontal member provides lateral support and/or points of attachment for any of various container holders being used, depending upon the type of container to hold the potted plant.

The vertical member 5 of each of these brackets is equipped with two adjustable attachments. The lower of these is a tangentially mounted sweep arm 6 which wipes the bottom of the enclosure to direct all spilled mix to a discharge opening in the bottom of the enclosure; the upper attachment is a vertically adjustable circular metal plate 7 to support the container for the plant, which metal plate is adjusted to suit the height of the particular container being used.

The complete table and bracket assemblies are supported and rotated in a sequence of 90° movements by a vertical axle 8.

This axle 8 is in turn supported on pre-lubricated sealed ball bearings contained within a tubular steel casing 9 attached to the fixed, semi-circular steel enclosure and supporting sub-structure 10 which also supports the drive mechanism. A suitable portion of the bottom 11 of this enclosure is removed to form the opening 6 which is connected to a hopper 12 which allows spilled mix to be fed through the opening by the sweep arm 6 to be recycled and re-used by an attached vertical bucket elevator 13.

The vertical elevator may serve one or two functions. Potting mixes vary considerably in flow characteristics and are at best a difficult material to handle. Dry mixes flow more readily than wet, so that with a dry mix, the hopper at the base of the elevator will be used to supply both the recycled material and a continuous supply of new mix to suit the containers being used. The mix is then elevated and discharged through a metering device and through a steeply angled pipe 14.

With a wet mix, the elevator hopper would be used only to recycle spillage by delivering it to an elevated hopper having in its base a rotary screw conveyor which would also discharge into a steeply angled pipe; in either case the lower end of this pipe would be provided with means for quick interchange of any of the various distribution spouts which may be required to suit the particular type of container being used.

The machine is particularly efficient in the filling of plastic bags due to the unique device used to both open and retain the bag in position during the filling and compacting portion of the cycle; however, no modification is required other than the change of container supports to those which are suitable for the other types of plant containers.

In potting into plastic bags, the operation begins with the installation of the bag on the bag holder 15. The bag holder consists of two curved vertical metal collars, one collar 16 of which is fixed, the other collar 17 being movable but both supported on a frame 18 which is pivoted by pins 19 on to the arm 4, this frame 18 also has an arm 20 extending downwardly through the rotating table which carries a roller cam follower 21.

The front fixed portion of the bag holder consists of an upper funnel shaped portion with two vertical collars 16, 17 extending downward on each side of an opening; this assembly being fixed to the frame 18 which is pivoted to the arm 4. Also attached to this frame are suitable guide rods 22 which control the movement of the rear portion of the holder which consists of the collar 17 which is of semi-circular internal shape and of the same height as those on the front fixed collar 16 and is under spring tension which both opens the bag and retains the bag in position for filling and compaction.

The position of this entire device is controlled by a fixed cam 23 on the main axle housing through the cam follower 21. At the time the bag is to be installed the bag holder is inclined at approximately a 45° angle from the horizontal. The operator places the partially open bag mouth on and around the rear movable member, pulling forward against the spring tension and placing the bag then around the forward fixed member. When released the spring then pulls the bag fully open and retains it, ready for filling.

As the bag is moved to the filling station by the 90° movement of the rotating table it passes over an adjustable bar which folds the bottom of the bag to a flat position; also during this time, the cam which has been holding the bag holder up is now curved to allow the holder to come to a horizontal position as it moves between the two stations.

The vertical bucket elevator or screw conveyor which delivers mix to the potting station is driven by a variable speed electric motor with the control device convenient to the potting station so that the operator can accurately adjust the quantity of material being delivered to fill, in this case, the plastic bag and accommodate to the variations of rate of flow of the mix. The motion of travel between the stations is very rapid, and the amount lost to spillage during this time is minimal.

As the filling is taking place, the plant is now manually inserted in the bag, and since the material is falling vertically around the plant the roots tend to be forced downwardly in the pot creating the optimum condition for future growth.

As the now filled bag and plant are moved by the next 90° movement of the rotating table, a series of sharp vertical blows are imparted to the bracket 5 and thus to the entire bag holder by a cam follower 24 on push rod 25 acting on the basic bracket 5 moving over a cam 24a which is attached to the axle 26 on gear box 27. This is adjustable for height so that the amount of compaction can be from nil to the full drop of the cam lobes, the bag resting on the plate 7 which vibrates to compact one bag.

As the now finished planting is moved through the next 90° movement of the rotating table, the cam follower 21 of the bag holder is actuated to lift the holder to an angle of approximately 45°, thus freeing the bag for removal from the machine. The opening in the front fixed portion of the bag holder allows this action to take place without damage to the plant. The potted plant is now ready for removal from the machine, manually or mechanically. This can be done as part of the machine's operation with a suitable rotating device synchronised with the arrival of the plant at this station and driven from the primary drive of the machine to operate during the time when the rotary table is stationary, as it is at this time.

The follower riding the cam fixed to the main axle housing now continues to hold the bag holder elevated during the next 90° movement of the rotating table to return the bag holder to its original position at the beginning of the cycle.

The 90° travel movements of the rotating table are intermittent with dwell time between movements to allow time for the various operations to take place. This is accomplished through the use of two rotating plates 28, 29 in the substructure of the machine, a driving plate 28 and a driven plate 29 forming a Geneva mechanism.

The driving plate 28 is attached to the gear box 30 driven by a variable speed electric geared head motor 31 by belt 32. A stub shaft 33 and roller 34 are secured to this plate on a radial line so that they travel a circular path. The axes of rotation of the two plates are so arranged that this circular path intersects that of a corresponding radial line on the driven plate. On the driven plate, and along four radial lines at 90° spacing are four pairs of guide bars 35 spaced to receive the roller of the driving plate; interaction between the two thus advances the driven plate 90° with each full rotation of the driving plate.

The driving plate may also control by a suitable cam lobe on its periphery and through a series of levers, a gate or trough at the discharge of the screw conveyor or vertical bucket elevator so that the flow of the correct amount of material is synchronised with the motion of the rotating table to deliver this amount at the correct time while the container is in position.

To fully index the driven wheel and hence the rotating table, a spring loaded roller 35 is so positioned that when the driven wheel comes to rest, the roller partially enters the space between two of the guide bars 35 and prevents any further motion until the force of the driving roller overcomes this resistance and allows the driven plate to again move through a 90° segment.

The geometry of this arrangement is such that the actual rotation of the rotating table takes place during a short central part of the time that the driving roller is engaged in the guide bars. This allows the maximum time for the operators to do their work, and also helps minimise spillage.

Figure 6:
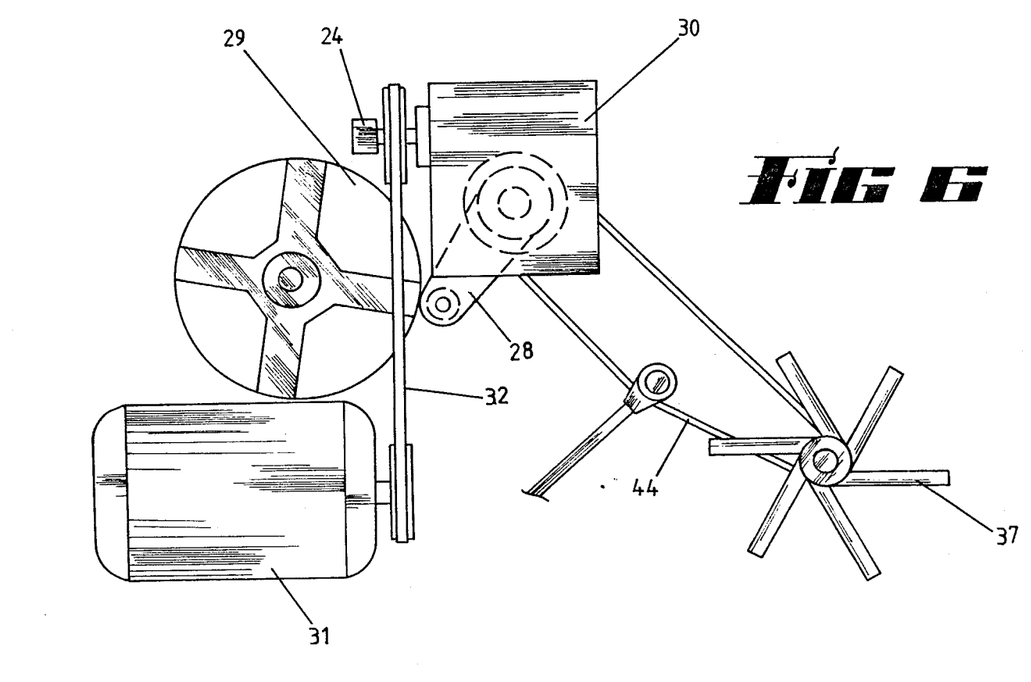
FIG. 6 is a schematic view of the drive mechanism.

As shown in FIG. 6 the electric motor 31 drives via belt 32 the gear box 30. This has a vertically downwardly extending shaft on which is mounted the plate 28. Also mounted on the shaft is a pulley which drives by a V belt 44, an agitator 37 which is positioned in the bottom of the hopper 12 to feed the material into the elevator 13.

Also mounted in the hopper 12 is a sensing unit and switch 38 which senses the level of the mix in the hopper, the switch controlling a feed conveyor or the like (not shown) which delivers the mix to the hopper 12.

The elevator 13 is driven by its own electric motor 39.

A bag holder 40 is mounted on the front of the machine in which the bags to be used are stacked in flat condition. A bag pick-up is provided, and this includes a pipe 41 which is connected at its end 42 to a source of reduced pressure, such as provided by a vacuum cleaner. In the end of the pipe 41 which protrudes into the holder 40, there is provided a telescoping pipe which can fall by gravity to have its end contact a bag in the holder. When this occurs the bag seals the end of the slidable pipe, and the reduced pressure in the pipe causes the pipe and bag to be lifted whereby the operator can grasp the bag, whereupon the pipe immediately falls to engage the next bag.

Figure 1:
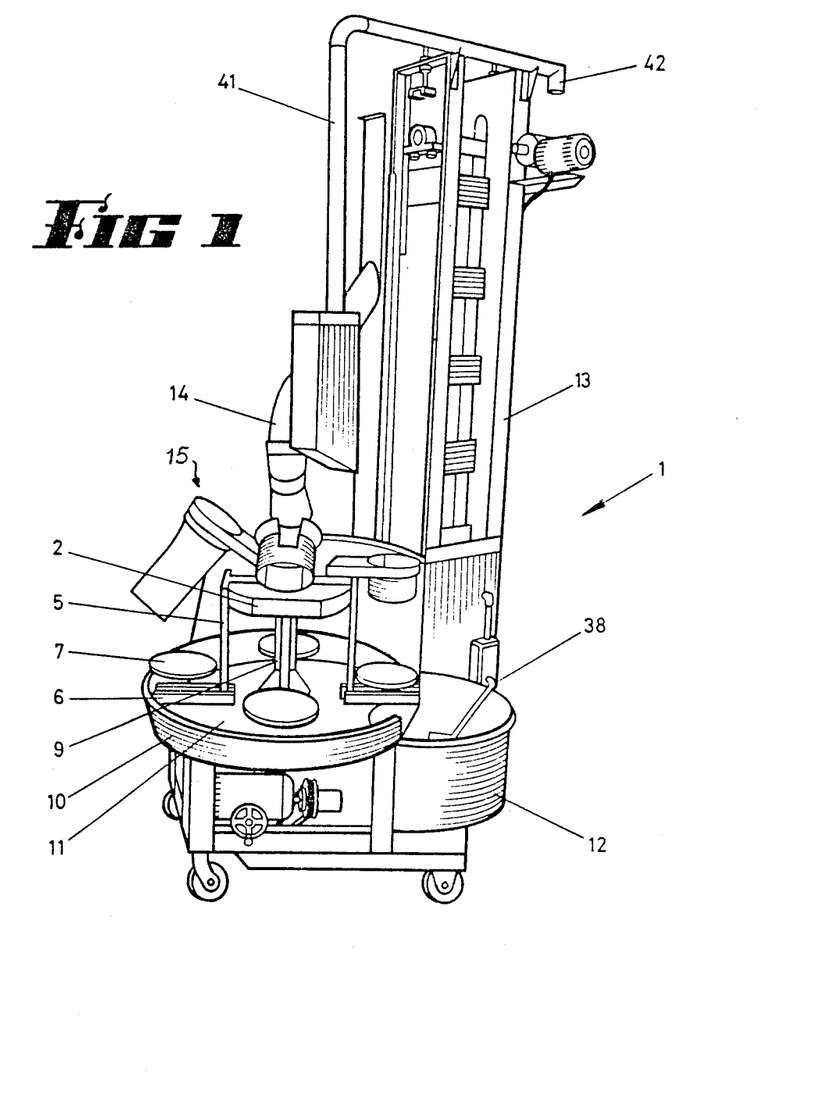
FIG. 1 is a view from one side of the machine.
Figure 2:
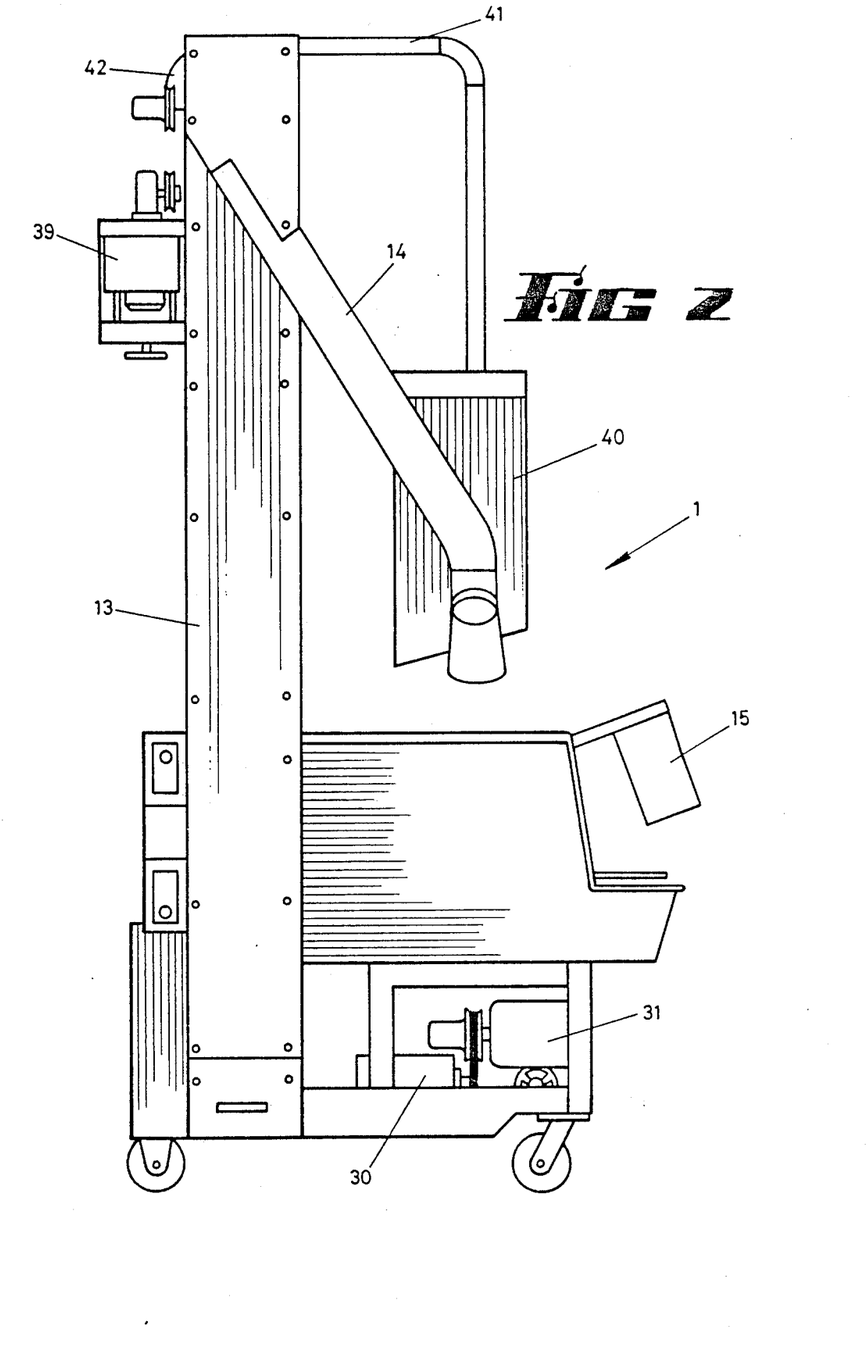
FIG. 2 is a view from the opposite side.
Figure 3:
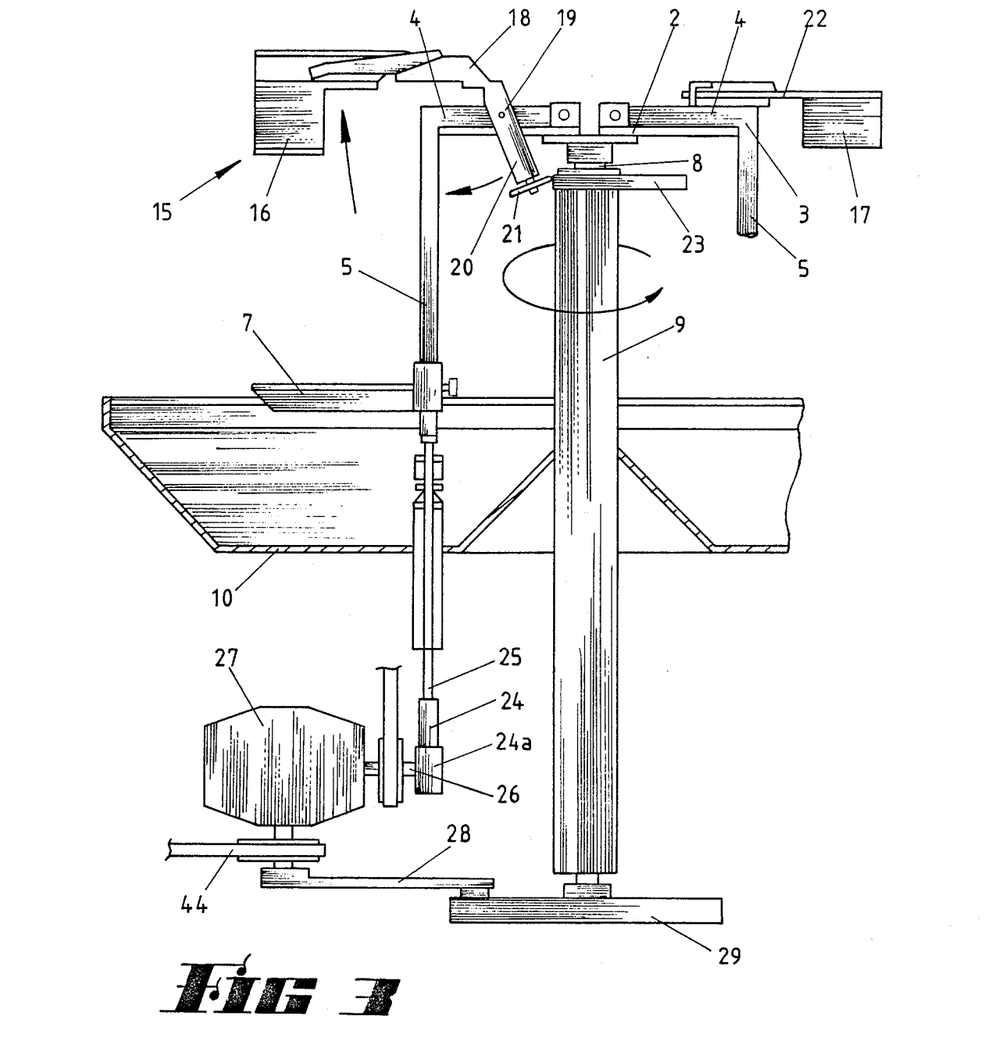
FIG. 3 is a semi-diagrammatic view of part of the potting mechanism.
Figures 4, 5:
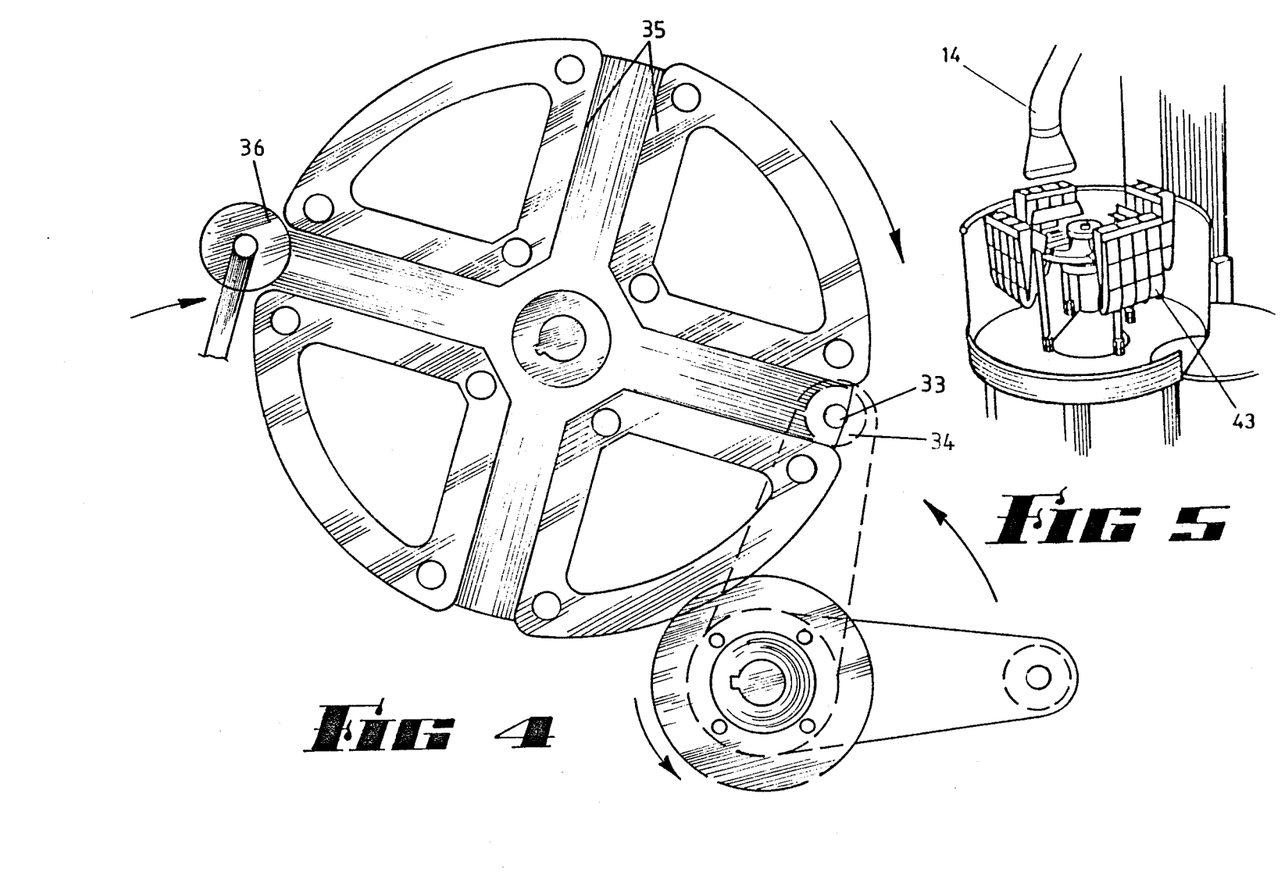
FIG. 4 is a plan view of the indexing mechanism.
FIG. 5 is a view of alternative holders for the bags.

FIG. 5 shows a further form of the invention where bags are filled, the bags being held in a wire cage 43.

For containers other than plastic bags, it is simple to remove the bag holders and substitute suitable holding devices for hard pots, root trainers, milk cartons or any other type of plant container. The compaction portion of the cylce is still available since it is actuated from the basic bracket. If, for some reason, compaction is not desirable, or a different degree is required, it is simple to adjust the sawtooth cam for the desired result.

A production counter, actuated by the control mechanism of the discharge flow control, is placed conveniently so that an accurate count of production can be maintained.

The hopper at the base of the vertical elevator has either perpendicular or sharply sloped side walls, but due to the characteristics of potting mixes and their tendency to bridge and refuse to flow, a rotating agitator driven from the primary drive shaft is also incorporated. Blades on this agitator may be either perpendicular or slightly helical in shape so as to both maintain flow of material and tend to direct it to the inlet of the vertical elevator.

Although there are several other potting machines on the market, they all appear to have one or more of several faults. Most are bulky, space wasteful machines; one of the newer, hydraulically driven machines requires a 5.5 hp power pack. Another machine in use requires 5 motors of varying capacities. However, in the present invention only two fractional horse power motors of one third hp are required. For hard pots, changing from one size to another can be a laborious and expensive process in some known machines because of the large number of holders required. With some it is difficult or impossible to adapt to root trainers or other new containers as they may be developed.

Those which use a vacuum type holder for plastic bags are all very sensitive to bag size and will fail to open or hold a bag which is not almost to design dimensions. With the considerable difference in bags of the same nominal size, this can be a real problem.

Many are also very noisy in operation which must be a consideration in operator comfort and efficiency during the prolonged usage of this type of equipment which the nature and timing of potting of plants in various stages of growth dictates.

The sequence of the operation, particularly with small seedlings, may well be the most important aspect from the point of view of optimum plant growth. In many of the currently available machines the pot is filled, then compacted, then is "dibbled", that is a hole is bored in the compacted mix and the young plant is forced into this hole. An unskilled or careless operator can inhibit new growth and seriously damage the tender root system by forcing that root system upward. This leaves the plant in a difficult situation as the normal growth pattern is downward, and the fragile roots must permeate the already compacted mix.

The machine described herein has been designed to eliminate many if not all of these problems. The unique bag holder will accommodate a large variation of bag circumferences, the support plate for the bottom of the bag is completely and easily adjustable. Only four fixtures are required to accommodate any other type or kind of container and there is the further choice as to supporting them from either the bracket cross arm or the bottom support plate.

The sequence of the operation of this machine is opposite to these known machines. According to the present invention the plant and the mix are placed in the container simultaneously and since the mix is falling vertically it tends to force the root system downward and completely surround the roots. Compaction then settles the mix firmly around the roots already in a favourable condition for ongoing growth.

The machine is very compact, occupying a floor space of only 900 mm × 1200 mm., elimination or suppression of noise has been a prime consideration in the design of the machine. Power consumption has been kept to an absolute minimum.

Preferably prelubricated and sealed ball bearings are used throughout this machine so that no periodic lubrication is necessary; the only maintenance required is the periodic inspection of V belts. All purchased components such as motors, bearings and V belts are standard, readily available parts and have been chosen for their availability world-wide.

Finally, the capital investments of this machine is substantially less than that required for any such machine now presently on the market.

Although one form of the invention has been described in some detail it is to be realised that the invention is not to be limited thereto but can include various modifications falling within the spirit and the scope of the invention.

I claim:

1. A potting machine for potting mix and a plant in a potting container comprising four holders to receive a container for the plant, each holder being mounted on a rotatable bracket by means of an anguar shaped arm pivoted to the bracket, one end of each arm carrying a respective holder and the other end contacting a stationary cam, said bracket being mounted on a vertical shaft, said shaft being mounted in a stationary sleeve, said cam being positioned on said sleeve so that as the bracket rotates said holders are tilted upwardly at at least one of a series of stations, means for rotating said bracket in step-wise fashion so that each holder passes through said series of stations, means to deliver potting mix to a container held by the holder at a filling station while the roots of a plant are in the container, and means to vibrate the container to compact said mix.

2. A potting machine as defined in claim 1 wherein said bracket is rotated step-wise by a Geneva type mechanism.

3. A potting machine as defined in claim 1 wherein each said holder comprises a pair of semi-circular members, one member being fixed to said angular shaped arm, the other member being resiliently biased thereto to be spaced from said first member whereby the holder resiliently holds a bag placed thereon.

4. A potting machine as defined in claim 1 wherein said machine comprises a base frame carrying a driving motor, a reduction gear box driven by said motor, the output shaft of said gear box carrying a rotatable arm carrying at its end a roller, said vertical shaft having mounted at its lower end a plate having four radial passages, said roller on said rotatable arm engaging sequentially in said passages to index said shaft 90° on each rotation of said rotatable arm.

5. A potting machine as defined in claim 4 wherein said base frame has mounted thereon a hopper feeding the mix to an elevator, a chute leading from the upper part of said elevator to a feeding head at the feeding station, a tray beneath said holders, sweep means carried by said rotatable bracket to sweep spilled mix into the hopper, the hopper having an agitator driven by the output shaft of said gear box.

6. A potting machine for potting mix and a plant in a potting container comprising a plurality of holders to receive a container for the plant mounted on a rotatable bracket, means for rotating said bracket in step-wise fashion so that each holder passes through a series of stations, means to deliver potting mix to a container held by the holder at a filling station while the roots of a plant are in the container, and means for vibrating the container to compact the mix, the vibrating means including a cam mounted on a rotary input shaft of a gear box, a cam follower engaging said cam, a push rod engaging said cam follower, the rotatable bracket having pivoted thereto depending arms carrying a plate to support the container, said push rod engaging said depending arms to vibrate said plate, and thus compact the mix in the container.

* * * * *

UNITED STATES PATENT AND TRADEMARK OFFICE
CERTIFICATE OF CORRECTION

PATENT NO. : 4771569

DATED : September 20, 1988

INVENTOR(S) : Ian S. Tolley

It is certified that error appears in the above-identified patent and that said Letters Patent is hereby corrected as shown below:

On the title page (22) and (86) PCT file date and number should read as follow: -- March 14, 1983 -- and --PCT/AU83/00033--.

Signed and Sealed this

Sixth Day of June, 1989

Attest:

DONALD J. QUIGG

Attesting Officer

Commissioner of Patents and Trademarks